No. 729,156. Patented May 26, 1903.

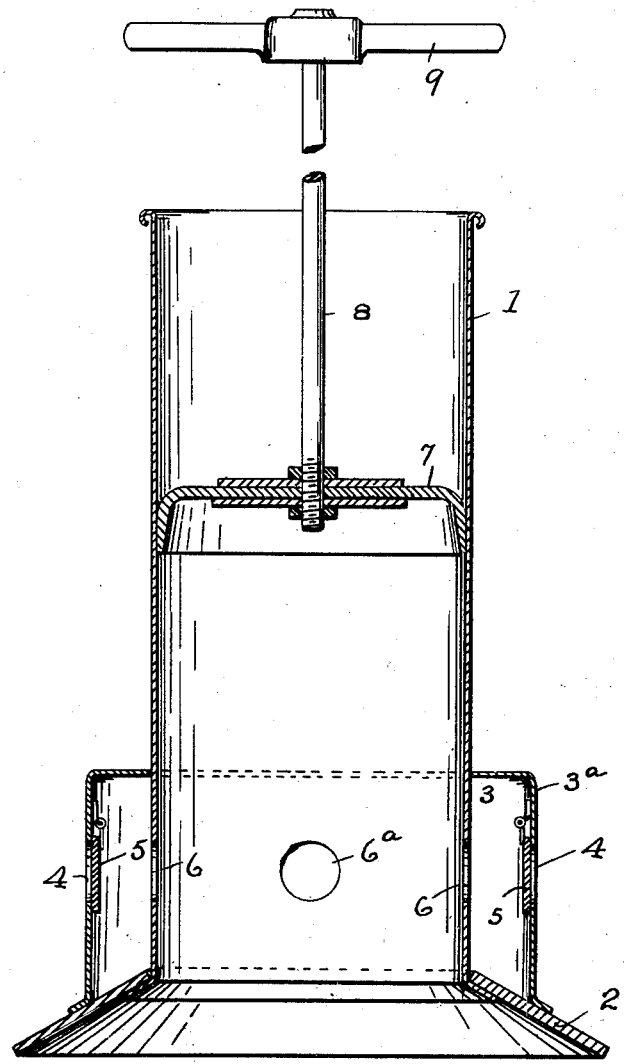

UNITED STATES PATENT OFFICE.

KREAMER S. GEIGER, OF BIRDSBORO, PENNSYLVANIA.

PUMP.

SPECIFICATION forming part of Letters Patent No. 729,156, dated May 26, 1903.

Application filed February 7, 1903. Serial No. 142,370. (No model.)

*To all whom it may concern:*

Be it known that I, KREAMER S. GEIGER, a citizen of the United States, residing at Birdsboro, in the county of Berks and State of Pennsylvania, have invented certain new and useful Improvements in Pumps; and I do hereby declare the following to be a full, clear, and exact description of the invention, such as will enable others skilled in the art to which it appertains to make and use the same.

This invention relates to improvements in pumps; and the object is to provide a device for use more particularly in forcing sediment and other foreign substances from the drain-pipes leading from washbasins, bath-tubs, &c.

The invention consists of a casing having an air-chamber around its lower end provided with suitable valves and a plunger operating inside of said casing.

The invention is fully described in the following specification and clearly shown in the accompanying drawing, which illustrates my device in vertical section.

The casing 1 is circular in cross-section, has an open top, and has formed around its lower edge a flaring projection 2 of suitable pliable material, such as sheet-rubber. Around the casing 1 at its lower end, immediately above said projection 2 2, is formed a chamber 3 by means of a supplemental casing 3ª, having two openings 4 therein directly opposite each other, which openings are closed by means of valves 5 from the inside. The lower end of the casing 1 is formed with openings 6, which register with the said openings 4, and it also has two additional openings 6ª midway between the said openings 6, making four equidistant openings therein. These four openings in the casing 1 are not closed by valves, as are the openings 4; but they all communicate with the chamber 3.

A plunger 7 fits snugly in the casing 1, moves freely therein, and is provided with a rod 8 and suitable handle 9.

When the device is inserted in a basin containing a sufficient quantity of water to cover the valve-openings 4, the plunger is drawn up, sucking the water into the casing through the openings 4, 6, and 6ª, and when the plunger is returned the valves 5 will close the said openings 4 and the water and air will be forced into the drain-pipe over which the device has been placed. The pliable flaring piece 2 will with a little hand-pressure on top of the casing insure an air-tight connection while the plunger is being operated.

The device may be advantageously used in opening drain-pipes of all kinds that have become clogged with sediment or other foreign substances.

Having thus fully described the invention, what I claim, and desire to secure by Letters Patent, is—

A force-pump comprising an open-top casing 1, a pliable flaring projection 2 secured to its lower edge, a supplemental casing 3ª, a chamber 3 formed around the lower end of said casing by means of said supplemental casing 3ª, valve-openings 4 forming communication between the outside and the inside of the chamber 3, openings 6 and 6ª in the casing 1 forming a means of communication between the chamber 3 and the inside of the casing 1, and a plunger 7 located and adapted to move freely in said casing, all substantially as and for the purpose set forth.

In testimony whereof I affix my signature in presence of two witnesses.

KREAMER S. GEIGER.

Witnesses:
JACOB M. PRUTZMAN,
CLIFTON C. SANDS.